Feb. 15, 1955

M. H. LANGE 2,702,064

SEPARATOR BOX ATTACHING APPARATUS
FOR SEPARABLE SLIDE FASTENERS

Filed Aug. 23, 1950

MAX H. LANGE
INVENTOR.

BY

ATTORNEY

Feb. 15, 1955
M. H. LANGE
2,702,064
SEPARATOR BOX ATTACHING APPARATUS
FOR SEPARABLE SLIDE FASTENERS
Filed Aug. 23, 1950
3 Sheets-Sheet 2
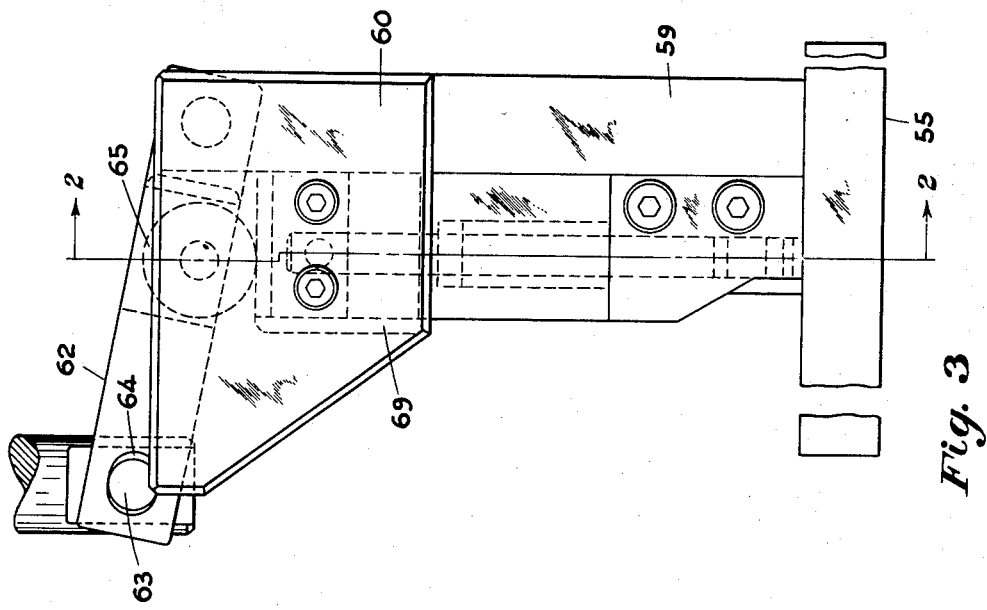
Fig. 3
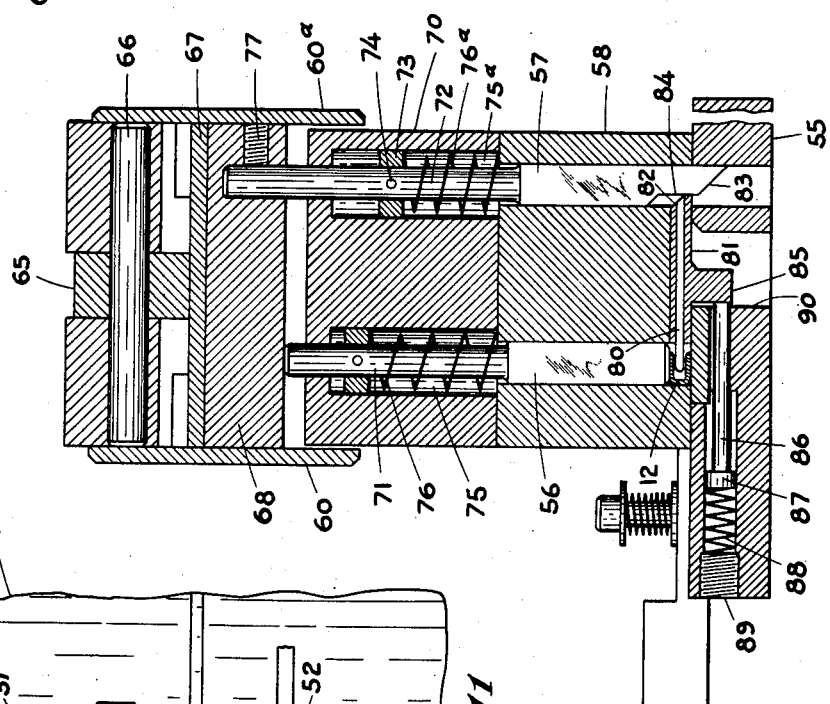
Fig. 2
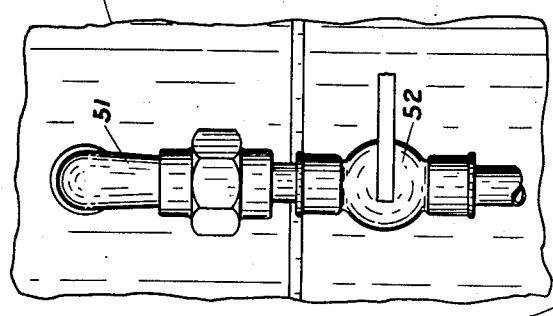
Fig. 11
INVENTOR.
MAX H. LANGE
BY
ATTORNEY Feb. 15, 1955
M. H. LANGE
2,702,064
SEPARATOR BOX ATTACHING APPARATUS
FOR SEPARABLE SLIDE FASTENERS
Filed Aug. 23, 1950
3 Sheets-Sheet 3
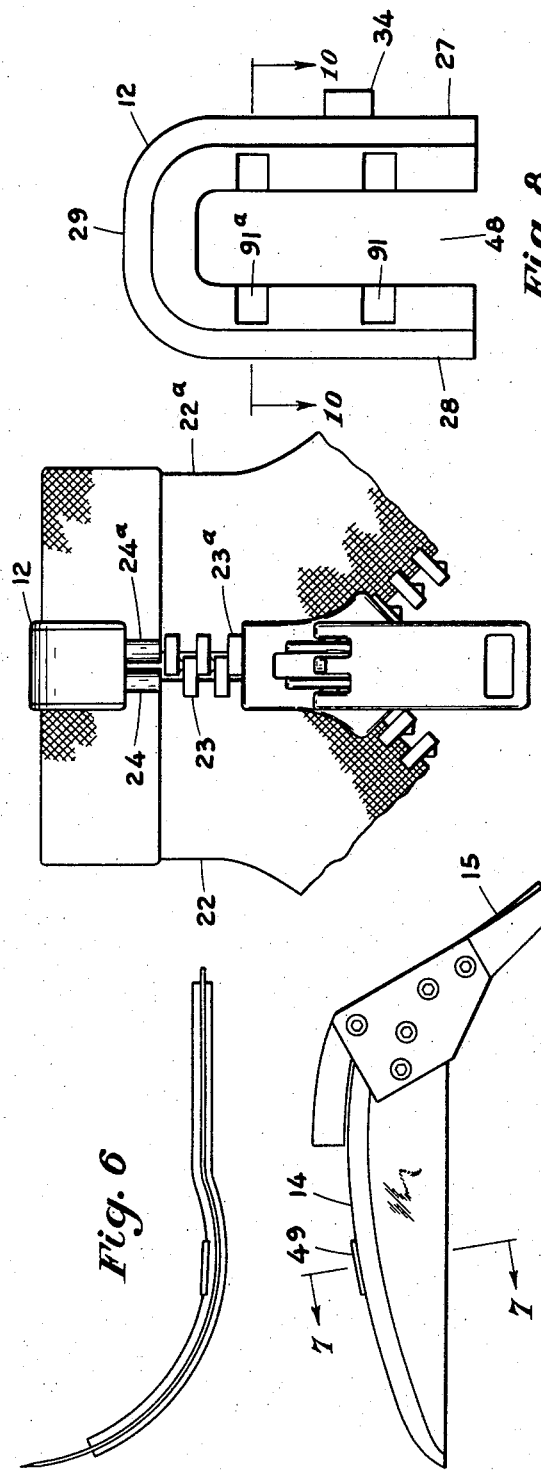
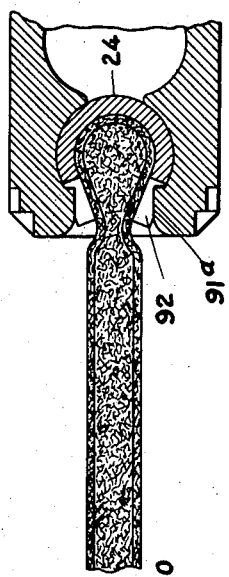
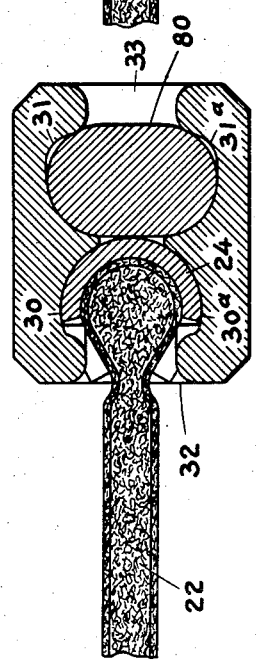
INVENTOR.
MAX H. LANGE
BY
ATTORNEY

United States Patent Office 2,702,064
Patented Feb. 15, 1955

2,702,064

SEPARATOR BOX ATTACHING APPARATUS FOR SEPARABLE SLIDE FASTENERS

Max H. Lange, New York, N. Y., assignor to Slidelock International, Ltd., New York, N. Y., a corporation of New York Application August 23, 1950, Serial No. 181,046

6 Claims. (Cl. 153—1)

This invention relates to a machine used in a step in the process of manufacturing of slide fasteners of the separable type, in which separators, in the form of channels, are attached to one end of each of the two fastener tapes, the two separators being fitted into a holder or box, which clamps one of the separators and tapes, and allows the other side of the tape with the separator attached thereto, to be removed, thereby detaching the two fastener tapes.

The separator holder, or box, is so constructed, that one of the fastener tapes, and the separator attached thereto, are clamped into one side of the box, a channel formed in the opposite side of the box slidably supporting the separator attached to the opposite tape, so that it can be manually inserted, or removed, and maintained in accurate parallelism and alignment with the fixed separator, so that the interlocking elements are located in accurate alignment, to allow the slider to move the opposite elements into the interlocking position.

In fasteners of this type, it is important that the two separators, and the tapes to which they are attached, be maintained in accurate parallelism, and alignment, to accurately align the interlocking fastener elements, thereby permitting them to open and close freely.

While various types of separator holding devices have been used for this purpose, the essential feature of their construction is that one of the separators be clamped in one side of the box, or holder, and the opposite separator removably inserted in the opposite side, to maintain the proper spacing and relationship between the opposite fastener elements.

In attaching a box, or holder, of this type it is important that the separator and the tape, to which it is attached, be held in accurate alignment with the opening in the box, to enable it to be clamped in the proper position. It is further important that the channel, formed in the opposite side of the box, be retained in the open position, during the clamping operation, to enable the opposite separator to be inserted after the clamping operation is completed.

Due to the fact that the channel, formed in one side of the box, is higher than that in the opposite side, it is essential that the boxes be located in the same position, relative to the separator and the tape, so that the clamping side of the box is always located in the clamping position.

As this is one of the final operations in the manufacture of slide fasteners of this type, and it is performed after the elements, the separators, and the other accessories, are attached to the tapes, it is important that the box be attached to the separator in accurate alignment with the separator, and to allow the opposite separator and tape to which it is attached, to be inserted and removed without special fitting or adjustment. The cost of the complete fastener assembly, at this point in the process of manufacture, is relatively high, and the operation performed quite rapidly, so that any inaccuracy in the clamping of the box to the separator would result in considerable damage to, or rejection of completed fasteners, in quantities, before the error is detected.

It is also important that the apparatus maintain its accuracy over sustained periods, without frequent adjustment, so that it can be mounted in any type of press, which is available, and operated by a relatively unskilled attendant.

The object of my invention is to provide an apparatus for attaching separator boxes to slide fastener separators, which progressively feeds the boxes, in their open form, to the point of assembly and clamping, accurately positions and locates the box with relation to the separator and the tape, which may be manually inserted into one of the box channels, and clamps the box over the tape and the separator, while retaining the opposite channel in the open position.

A further object is to provide a feeding and support mechanism, which will accurately align the box with the separator and tape, feed the box in the proper assembly position, and prevent reversal of the box in the assembly position.

A primary object is to provide a device for this purpose, which is self-contained and independent of the press for accuracy and directional control, so that it can be installed in, and removed from the press, without disturbing the adjustment of the assembly apparatus in any manner.

Another object is to provide a device, which will accurately support the box in alignment with the separator and the tape, so that the box can be assembled with a minimum of distortion.

An important object is to provide an apparatus, which can be operated and maintained by an operator of ordinary skill, and which will maintain its adjustment and accuracy, with relatively little attention, over sustained periods.

A major object is to provide a machine, which can be manually, or semi-automatically operated, the feeding and aligning mechanism being co-ordinated with the clamping mechanism, regardless of the method of operation employed.

The accompanying drawings, illustrative of one embodiment of the apparatus of my invention, together with the description of its construction and the method of installation and operation thereof, will serve to clarify further objects and advantages of my invention.

In the drawings:

Fig. 2 is a vertical section through the clamping mechanism, taken at 2—2, Fig. 3, with the separator box in place, the plunger in the clamping position, and the arbor inserted in the box channel.

Fig. 3 is a side elevation of the clamping mechanism, shown in Figs. 1 and 2.

Fig. 4 is a plan view of an assembled separable fastener, with the separators, attached to both fastener tapes, inserted in the box.

Fig. 5 is a side elevation of the hopper feed rail, and the upper portion of the feed chute, shown in Fig. 1.

Fig. 6 is a plan view of the hopper feed rail, and a portion of the chute of Figs. 1 and 5.

Fig. 8 is a side elevation of the separator box, shown in Fig. 4.

Fig. 9 is a cross-section through the box of Fig. 8, in the assembly position, with the tape and separator clamped in the channel on one side, and the arbor fitting the channel on the opposite side.

Fig. 10 is a section through one of the channels of the box of Fig. 8, after assembly with the tape and the separator, showing the projections in the box, which fit into slots, formed in the separator.

Fig. 11 is a front elevation of a portion of the hopper, of Fig. 1, showing the air line and the air-control valve.

Figures 1, 7:
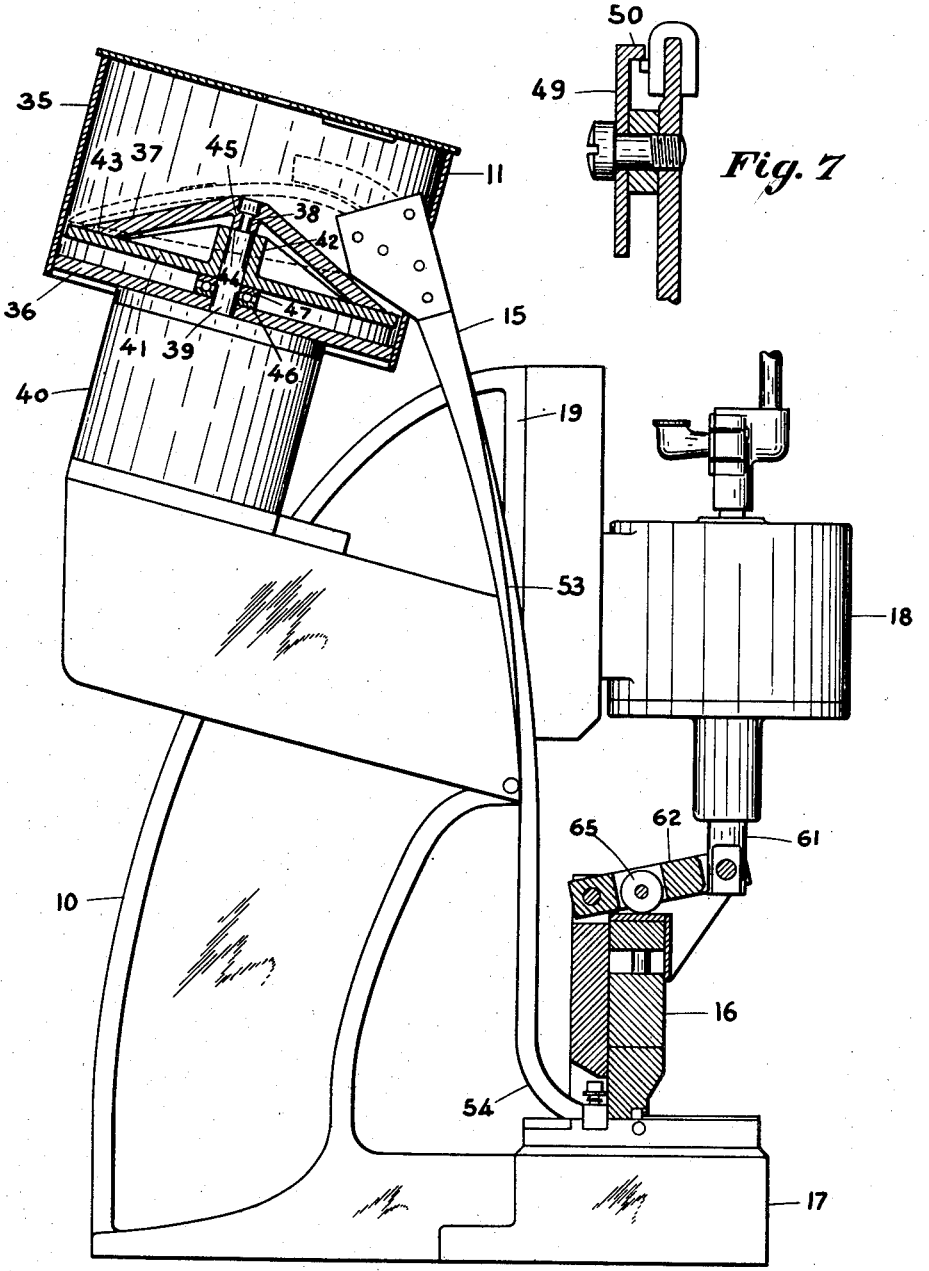
Fig. 1 represents a side elevation of the assembled machine, a vertical section through the hopper, and a vertical section through the box assembly and clamping mechanism.
Fig. 7 is a section through the rail of Figs. 5 and 6, showing the method of retaining and orienting the separator box on the rail, taken at 7—7, Fig. 6.

It will be understood that the following description of the construction and the method of utilization and operation of the separator box attaching apparatus for separable slide fasteners, is intended as explanatory of the invention and not restrictive thereof.

In the drawings, the same reference numerals designate the same parts throughout the various views.

One embodiment of the machine, shown in Figs. 1 and 2, may be mounted on a frame or base 10, as indicated in Fig. 1, with a cylindrical hopper 11, which selects and feeds the boxes or holders 12, along a rail 14, mounted inside the hopper wall, the boxes passing from the rail, down along a chute 15, to the clamping mechanism 16, mounted on the bed 17, of the machine frame. An air or hydraulically operated cylinder 18, supported on the vertical column 19, of the frame, above the clamping mechanism, may be utilized to actuate the clamping mechanism.

The separable fastener, shown in Fig. 4, comprises a pair of tapes 22 and 22a, with a set of interlocking elements 23 or 23a, attached to the corded edge of each of the tapes. A separator end 24 or 24a may be attached to the lower end of the corded edge of each of the tapes, as indicated in Fig. 4, the separators fitting into parallel channels, formed in the box, one side of the box being clamped to one of the separator ends 24, in a manner hereinafter described.

The separator box 12, shown in Fig. 8, may be made in the form of a substantially U-shaped member, having an upper wall 27, and a lower wall 28, the two walls being formed integral with a connecting wall 29, located at one end of the upper and lower walls, the opposite end being open.

As indicated in Figs. 9 and 10, a pair of grooves 30 and 31 may be formed in the upper wall of each of the boxes, with similar grooves 30a and 31a, formed in the lower wall, the grooves forming a pair of channels 32 and 33, into which the separators, attached to the two tapes, are fitted.

A protrusion 34, of cylindrical or other suitable form, may be formed in the upper wall 27, of the box, by pressing a small section of the metal of the upper wall outward, as indicated in Fig. 8. The protrusion 34 is used as a means of identifying and locating the upper wall in the process of feeding the boxes from the hopper to the clamping mechanism, in order that the upper wall be located in the upper position in the clamping position, so that the smaller channel 32, formed in the box, may be clamped to one of the separator ends 24.

During the clamping operation, the protrusion 34 is pressed into the upper wall 27, of the box, in a manner hereinafter described, the outer surface of the upper wall being flush after the clamping operation is completed.

The hopper 11 comprises a substantially cylindrical container, having an outer wall 35, welded or otherwise attached to the bottom wall 36, thereof. A substantially conical guide member 37 may be attached to the reduced diameter upper end 38, of a shaft 39, rotatably supported by the bottom wall 36 of the hopper. The shaft 39 may be driven by a motor, or other suitable driving means, through a reduction gear 40, mounted below the hopper. A plate 41 having a hub 42, formed at the center thereof, may be fitted into the inner area of the tubular hopper wall, the flat lower surface 43, of the guide member, fitting against the surface of the plate 41. An opening formed in the center of the hub 42, of the plate, may be pressed on the body of the shaft.

A shoulder 44, formed at the upper end of the shaft 39, engages the lower edge of a hub 45, formed integral with the upper end of the guide member, thereby locating the guide member with relation to the plate 41.

A ball type thrust bearing 46, may be mounted on the shaft 39, between the bottom wall of the hopper container, and the bottom of the circular plate 41, the upper race 47, of the bearing, supporting and locating the circular plate 41, and the conical guide member 37.

As indicated in Figs. 5 and 6, a sloping rail 14, of arcuate form, may be mounted inside the outer wall of the hopper, the lower edge of the tapered end of the rail engaging, or clearing slightly, the sloping surface of the conical guide member 37, to receive the boxes, as they are carried around by the rotating conical guide member, a slot 48, formed between the upper and lower wall of the box, clearing the sides of the rail to enable the boxes to be slidably fed along the rail.

A selector plate 49, may be mounted adjacent one side of the rail, as indicated in Figs. 5 and 7, the selector plate being located a distance slightly greater than the thickness of the wall of the box from the rail, to enable the boxes to slide between the rail and the selector plate. A ledge 50, formed at the inner side of the plate engages the protrusion 34, formed in one wall of the box 12, to retain the boxes on the rail 14, when the boxes are fed along the rail in the proper position for feeding to the clamping mechanism.

Compressed air from a nozzle (not shown), may be blown upward, along the rail, at a point substantially in line with the selector plate 49. When the boxes are located in the proper position, with the upper wall, and the protrusion formed therein, on the side on which the selector plate is located, the ledge 50, formed on the selector plate, engages the protrusion 34, formed on the box wall, and retains the box on the rail.

Where the boxes are fed along the rail, in the opposite position, with the lower wall 28, of the box, on the side of the rail, adjacent the selector plate 49, the box is lifted by the air pressure, and blown off the rail, only those boxes in the proper position for assembly and clamping, continuing along the rail to the feed chute 15.

The compressed air to the nozzle in the hopper, which is used to blow the boxes, fed along the rail, against the ledge of the retainer plate 49, as hereinbefore described, may be supplied from a tank or compressor (not shown), through a tube 51, mounted alongside the outer wall 35 of the hopper, a manually-controlled valve 52, being connected to the tube, to regulate or shut off the supply of air to the nozzle, as indicated in Fig. 11.

From the rail, the boxes are fed along the chute 15, the upper end of which engages the outer end of the rail 14, the boxes being fed, by gravity, along the sloping section of the chute to the delivery end at the bottom.

A twist 53 may be formed in the sloping section of the chute, as indicated in Fig. 1, to place the lower wall 28, of the box at the bottom, in proper position for assembly at the delivery end, at the bottom of the chute. The arcuate section 54, formed at the bottom of the chute, transfers the box, with the walls in the vertical position, in which they are slid along the chute, to the assembly and clamping position, with the lower wall 28, of the box, in substantial alignment with the upper surface of the base plate of the assembly mechanism, when the box reaches the delivery end of the chute.

The assembly and clamping mechanism, shown in Figs. 2 and 3, may be supported by a base plate 55, which is mounted on the bed 17, of the machine frame.

A pair of plungers 56 and 57, of rectangular or other suitable cross-section, may be slidably supported in similarly shaped openings, formed in a block 58, attached to the base plate 55, the left-hand plunger 56, being in substantial alignment with the upper wall of the box 12, when it is fed into the clamping position, shown in Fig. 2.

The assembly and clamping mechanism may be supported by a column 59, attached to the upper end of the base plate 55, and by two side plates 60, attached to the sides of the column, as indicated in Fig. 3.

A piston rod 61, attached to a piston, mounted in the air cylinder 18, may be utilized to actuate the clamping mechanism.

A control lever 62, one end of which may be pivotally attached to the upper end of the support column 59, may be angularly mounted above the clamping mechanism, the opposite end of the lever being pivotally attached to the lower end of the piston rod 61, by means of a pivot pin 63, which fits into an elongated slot 64, formed in the control lever, to enable the control lever to be moved angularly without distorting the piston rod.

As indicated in Figs. 2 and 3, a roller 65 may be trunnioned on a pin 66, fitted to the lever 62, between the pivoted ends thereof, the roller being mounted in a slot, formed in approximately the center of the lever 62.

The roller 65, engages the upper surface of a plate 67, mounted on the upper end of a plunger control slide 68, slidably supported between the forward plate 69, the column 59, and the side plates 60 and 60a of the clamping mechanism. An intermediate block 70, may be mounted above the block 58, a gap being formed between the intermediate block 70 and the plunger control slide 68.

The upper section of the two plungers 56 and 57, may be turned down, to form two cylindrical sections 71 and 72, which may be slidably fitted into openings formed in the upper end of the intermediate block 70, to slidably guide the plungers.

A collar 73, may be mounted on the cylindrical section of each of the plungers 56 and 57, and attached to the corresponding plunger, by means of a pin 74, or other suitable attaching means, each of the collars fitting into a counterbore 75 or 75a, formed in the intermediate block. A coiled compression spring 76 or 76a, may be mounted below each of the collars 73, around the corresponding plunger 56 and 57, the upper end of each of the springs engaging the corresponding collar 73, to force the plungers upward when the pressure of the control slide 68, against the plungers, is released.

The upper end of the arbor control plunger 57, which is considerably higher than the clamping plunger 56, fits into a counterbore, formed in the lower end of the control slide 68, a set screw 77, threadably supported in the slide 68, adjustably clamping the plunger to the slide.

In the free position, a gap is formed between the upper end of the clamping plunger 56, and the control slide 68, thus allowing the arbor control plunger to move a considerable distance before the control slide engages the clamping plunger.

An oval-shaped arbor 80, may be fitted to an arbor-support bracket 81, slidably supported in a slot formed in the lower end of the block 58, as indicated in Fig. 2. The outer end of the arbor 80 and the arbor support bracket, may be bevelled 82, the bevelled surface engaging an angular surface 83, formed at the lower end of the plunger 57, when the plunger is moved from the free position, to the clamping position, shown in Fig. 2.

The inner edge of the plunger 57, may be notched, as indicated in Fig. 2, the face 84, of the notch, engaging the bevelled edge of the arbor support bracket 81, to press the arbor into the clamping position, shown in Figs. 2 and 9.

A lug 85, formed integral with the lower end of the arbor support bracket, engages the free end of a rod 86, attached to, or formed integral with a substantially cylindrical piston 87, slidably supported in a substantially circular counterbore, formed in the base plate 55. A coiled compression spring 88, one end of which engages the outer face of the piston 87, with the opposite end pressing against a plug 89, threadably inserted in an opening formed in the base plate, presses the piston outward, thereby restoring the arbor support bracket, and the arbor, to the free position, when the arbor control plunger 57 is raised by the spring 76a. The movement of the arbor support bracket 81 is limited by the wall 90, of the slot formed in the base plate 55, which engages the front edge of the lug 85, thereby limiting the forward movement of the arbor and the bracket in which it is mounted.

In the operation of the apparatus, one of the boxes 12 is fed to the assembly position, shown in Fig. 2, from the end of the chute 15, in the manner hereinbefore described. The left-hand fastener tape 22, with the separator end attached to the outer end thereof, is manually pressed into the left-hand channel 32, formed in the box.

When compressed air is admitted into the cylinder 18, by means of a control valve (not shown), the piston rod 61 is moved downward, thereby moving the control lever 62 and the control slide 68, with the arbor control plunger 57, attached thereto, downward.

The angular surface 83, at the lower end of the right-hand plunger 57, forces the arbor support bracket, and the arbor, attached thereto, inward, the end of the arbor entering the larger channel 33, formed between the right-hand grooves 31 and 31a in the box, to the position, shown in Fig. 9.

After the arbor enters the channel, in the box, the clamping plunger 56, is moved downward by the downward movement of the control slide 68, until the bottom of the plunger presses the upper wall 27, of the box, downward, the grooves 30 and 30a, formed in the walls of box, gripping the separator end, thereby clamping the separator end into the left-hand side of the box.

As indicated in Fig. 8, a series of projections 91, may be formed in the upper and lower walls of the box, adjacent the grooves 30 and 31. When the upper wall of the box is moved into the clamping position, by the downward movement of the plunger 56, the projections press against the outer surface of the separator end, or press into the tape, or the reinforcement strip attached to the tape, to tightly grip the separator end and the tape.

A slot 92 may be formed in each of the walls of each of the separator ends, at the open edge thereof, the distance between the slot and the edge of the separator end being substantially equal to the distance between the inner projection 91a, formed in the separator box, and the connecting wall 29, thereof.

In the clamping position, the inner projections 91a, formed in the upper and lower walls of the box, enter the slots 92, formed in the walls of the separator end, thereby locating the separator end, with relation the connecting wall of the box, and gripping the separator end, between the walls of the box.

In the assembled position of the box, shown in Fig. 9, the gap between the grooves 31 and 31a, at the right-hand side of the box, is greater than that between the grooves 30 and 30a, at the left-hand side, the left-hand grooves clamping the separator 24, attached to the left-hand tape.

During the clamping operation, the arbor 80 is fitted into the channel 33, formed between the right-hand grooves 31 and 31a, as indicated in Fig. 9, thereby retaining the grooves in the open position, so that after the two fastener tapes 22 and 22a, shown in Fig. 4, are assembled, the right-hand tape, 22a and the separator end 24a, attached to it, may be freely inserted in the channel 33 formed in the box, and removed therefrom, in order to completely detach the two sides of the fastener, from one another.

The separator box may be made, as shown in Figs. 8 and 9, or any other suitable type of box, or holder, may be substituted therefor.

The protrusion formed in the top wall of the separator box, for orienting the box in the assembly position, may be formed at the point indicated, or at any other suitable location, or other means of identifying the top and bottom wall of the box, for the purpose of orienting the box in the assembly position, may be substituted therefor.

The assembly and clamping mechanism, shown in Figs. 2 and 3 is completely self-contained, all parts being independently guided and aligned, the piston rod of the air cylinder of the press, in which it is mounted, merely supplying the power, or pressure, required to move the control lever and the plungers downward.

The upward or return stroke of the plungers of the clamping mechanism, is independent of the movement of the piston rod, coiled compression springs independently restoring the plungers to their initial position, after the piston pressure is released, a separate spring moving the arbor out of the channel in the box, after the clamping operation is completed.

The clamping plunger, the arbor actuating plunger, and the arbor support bracket, are guided by the vertical support blocks and the base of the clamping mechanism, and are therefore independent of the alignment between th piston rod, or ram of the press, the bed thereof, and the plunger axes.

The method of orienting the box on the feed rail, may be altered, depending upon the construction of the rail, and the method of supporting the box on the rail.

The hopper, for selecting and feeding the boxes to the feed rail and the chute, may be altered considerably, depending upon the type of feed rail used.

The feed rail and the feed chute, feeding the boxes from the hopper to the clamping mechanism, may be altered considerably, depending upon the construction of the hopper, the form and construction of the box, or holder, and the relative position of the clamping mechanism, and the hopper.

The clamping mechanism may be mounted in any suitable type of press, actuated by a hydraulic cylinder, a compressed air-actuated cylinder, a motor-driven, mechanically controlled press, or a foot-operated press, having sufficient power to move the plungers, against the spring pressure.

It will be apparent to those skilled in the art that my present invention is not limited to the specific details described above and shown in the drawings, and that various modifications are possible in carrying out the features of the invention and the operation, actuation, and utilization thereof, without departing from the spirit and scope of the appended claims.

What I claim is:

1. An apparatus for attaching a separator box to one of the tapes of a separable slide fastener, each of said tapes having a separator end attached thereto, each of said separator boxes having an upper and lower wall, connected by a wall formed integral therewith, said upper and lower walls having a pair of separator end-receiving channels formed therebetween, one of said separator box walls having a protrusion formed integral therewith, for differentiating said walls, comprising a separator box clamping mechanism, means conveying the boxes to the clamping mechanism, a pair of plungers slidably supported within said clamping mechanism, the first of said plungers being adapted to press against one wall of the separator box, to clamp the walls against the separator end, an arbor slidably fitted to one of the channels formed in the box, to retain the channel in the open position, during the clamping operation, an arbor support bracket slidably mounted between the first and second plunger supporting the arbor, means pressing said plungers into the operating position, a pivoted lever, operatively connecting the pressure means with the plunger control means, interposed between the clamping mechanism and the pressure means, said arbor support bracket being substantially perpendicular to the plungers, the lower end of the second plunger being bevelled, the end of the arbor support bracket adjoining the second plunger being matingly bevelled, the movement of the second plunger in the direction of the arbor support bracket sliding the arbor into one of the separator box channels, the movement of the clamping end of the first plunger being timed to follow the bevelled end of the second plunger, the first plunger being operative to clamp the separator box walls adjoining one channel over the separator end, while the arbor retains the opposite separator box channel in the open position, a coiled compression spring fitted around each of said plungers independently restoring each of said plungers to its free position, when the lever is raised, the arbor retaining one channel of the separator box, in the open position, while the separator box walls, adjacent the opposite channel, are clamped to the tape and the separator end attached thereto.

2. An apparatus for attaching a separator box to one of the tapes of a separable slide fastener, each of said fastener tapes having a separator end attached thereto, said separator box being of substantially U-shaped cross-section, with a pair of channels formed between the upper and lower walls thereof, for receiving the separator ends, comprising a frame, a feed rail, a separator box clamping mechanism, mounted on the base of said frame, a chute connecting the feed rail to the clamping mechanism, a pair of plungers slidably supported within said clamping mechanism, the first of said plungers being adapted to press against one wall of the separator box, to clamp the walls against the separator end, an arbor slidably fitted to one of the channels formed in the box, to retain the channel in the open position, during the clamping operation, an arbor support bracket slidably mounted between the first and second plunger, supporting the arbor, said arbor support bracket being substantially perpendicular to the plungers, the lower end of the second plunger being bevelled, the end of the arbor support bracket adjoining the second plunger being matingly bevelled, the movement of the second plunger in the direction of the arbor support bracket sliding the arbor into one of the separator box channels to retain the channel in the open position, the movement of the clamping end of the first plunger being timed to follow the bevelled end of the second plunger, the first plunger being adjusted to clamp the walls adjoining one channel of the separator box over the separator end, while the arbor retains the opposite channel in the open position, a coiled compression spring fitted around each of said plungers independently restoring said plungers to their free position, when the actuating pressure is released, the arbor retaining one channel of the separator box in the open position, while the saparator box walls, adjacent the opposite channel, are clamped to the tape and the separator end attached thereto.

3. An apparatus for attaching a separator box to one of the tapes of a separable slide fastener, each of said tapes having a separator end attached thereto, each of said separator ends having a slot cut through the walls thereof, said separator box having an upper and lower wall, connected by a wall formed integral therewith, said upper and lower walls having a pair of separator end-receiving channels formed therebetween, said separator box walls having a plurality of projections formed integral therewith, comprising a separator box clamping mechanism, having a clamping element slidably supported therein, a sloping rail guiding the separator boxes to the clamping mechanism, a selector plate mounted adjacent one side of the rail, said selector plate being located a distance greater than the thickness of the wall of the separator box from the rail, a ledge integral with the selector plate, directed toward the rail, engaging the protrusion in the separator box wall, to retain the separator boxes on the rail, said separator box projections fitting into the slots in the separated end walls, to locate the separator end with relation to the corresponding channel, formed in the box, a pair of plungers slidably supported within the clamping mechanism, the first of said plungers being operative to press one wall of the separator box to clamp the walls against the separator end, an arbor slidably fitted to one of the separator box channels, to retain one channel of the separator box in the open position, while the walls, adjacent the opposite channel, are clamped to the separator end and the tape to which it is attached, an arbor support bracket supporting the arbor, slidably mounted in the clamping mechanism, means limiting the movement of the arbor and the arbor support bracket toward the separator box channel, means pressing the plungers into the operating position, a pivoted lever operatively connecting the pressure actuating means with the movement limiting means, interposed between the clamping mechanism and the pressure actuating means, said arbor support bracket being substantially perpendicular to the plungers, the lower end of the second plunger being bevelled, the end of the arbor support bracket adjoining the second plunger being matingly bevelled, the movement of the second plunger in the direction of the arbor support bracket sliding the arbor into one of the separator box channels to retain the channel in the open position, the movement of the clamping end of the first plunger being timed to follow the bevelled end of the second plunger, the first plunger being operative to clamp the walls adjoining one channel of the separator box over the separator end, while the arbor retains the opposite separator box channel in the open position, and pair of coiled compression springs fitted around said plungers, independently restoring the first and second plungers to their initial position, when the pressure of the actuating mechanism is released, the arbor retaining one separator box channel in the open position, while the separator box walls, adjacent the opposite channel, are clamped to the tape and the separator end attached thereto, the projections formed in the box walls, projecting into the separator, to grip the separator end between the walls of the box.

4. An apparatus for attaching a separator box to one of the tapes of a separable slide fastener, each of said tapes having a separator end attached thereto, said separator box being of substantially U-shaped cross-section, with a pair of channels formed between the upper and lower walls thereof, for receiving the separator ends, one of said separator box walls having a protrusion formed integral therewith, for differentiating said walls, comprising a frame, a feed rail, a selector plate attached to the rail, said selector plate retaining the boxes on the rail, when the protrusions are in the assembly relation, compressed air means removing the boxes from the rail, when the walls of the box are reversed, a separator box clamping mechanism, conveying means connecting the feed rail to the clamping mechanism, a pair of plungers slidably supported within said clamping mechanism, the first of said plungers being adapted to press against one wall of the separator box, to clamp the walls against the separator end, said protrusion being pressed into the wall of the box during the clamping operation, an arbor slidably fitted to one of the channels formed in the box, to retain the box in the open position, during the clamping operation, an arbor support bracket slidably mounted between the first and second plunger supporting the arbor, said arbor support bracket being substantially perpendicular to the plungers, the lower end of the second plunger being bevelled, the end of the arbor support bracket adjoining the second plunger being matingly bevelled, the movement of the second plunger in the direction of the arbor support bracket sliding the arbor into one of the separator box channels to retain the channel in the open position, the movement of the clamping end of the first plunger being timed to follow the bevelled end of the second plunger, the first plunger being adjusted to clamp the walls adjoining one channel of the separator box over the separator end, while the arbor retains opposite channel in the open position, a pair of coiled compression springs fitted around said plungers independently restoring the plungers to their free position, when the actuating pressure is released, the arbor retaining one separator box channel in the open position, while the separator box walls, adjacent the opposite channel, are clamped to the tape and the separator end attached thereto.

5. An apparatus for attaching a separator box to one of the tapes of a separable slide fastener, each of said tapes having a separator end attached thereto, said separator box having an upper and lower wall, connected by a wall formed integral therewith, said upper and lower walls having a pair of separator end-receiving channels formed therebetween, one of said separator box walls having a protrusion formed integral therewith, for differentiating said walls, comprising a separator box clamping mechanism, means conveying the boxes to the clamping mechanism, a pair of plungers slidably supported within said clamping mechanism, the first of said plungers being adapted to press against one wall of the separator box, to clamp the walls against the separator end, an arbor slidably fitted to one of the channels formed in the box, to retain the box in the open position, during the clamping operation, an arbor support bracket supporting the arbor, slidably mounted in the clamping mechanism, means limiting the movement of the arbor and the arbor support bracket toward the box channel, means pressing said plungers into the operating position, a pivoted lever operatively connecting the pressure means with the control means, interposed between the clamping mechanism and the pressure actuating means, said arbor support bracket being substantially perpendicular to the plungers, the lower end of the second plunger being bevelled, the end of the arbor support bracket adjoining the second plunger being matingly bevelled, the movement of the second plunger in the direction of the arbor support bracket sliding the arbor into one of the separator box channels, the movement of the clamping end of the first plunger being timed to follow the bevelled end of the second plunger, the first plunger being adjusted to clamp the separator box walls adjoining one channel over the separator end, while the arbor retains the opposite channel in the open position, a pair of coiled compression springs fitted around said plungers independently restoring said plungers to their free position, when the actuating pressure is released, a depending lug integral with the arbor support bracket, a sliding rod mounted substantially parallel to the arbor support bracket engaging said lug, a coiled compression spring pressing the end of said rod opposite the arbor support lug toward the lug to independently remove the arbor from the box channel, and restore the arbor support bracket to its free position, when the pressure of the second plunger is released, the arbor retaining one channel in the open position, while the separator box walls, adjacent the opposite channel, are clamped to the tape and the separator end attached thereto.

6. An apparatus for attaching a separator box to one of the tapes of a separable slide fastener, each of said fastener tapes having a separator end attached thereto, said separator box being of substantially U-shaped cross-section, with a pair of channels formed between the upper and lower walls thereof, for receiving the separator ends, comprising, a separator box clamping mechanism, means conveying the boxes to the clamping mechanism, a pair of plungers slidably supported within said clamping mechanism, the first of said plungers being adapted to press against one wall of the separator box, to clamp the walls against the separator end, an arbor slidably fitted to one of the channels formed in the box, to retain the channel in the open position, a bracket, supporting the arbor, slidably mounted in the clamping mechanism, means limiting the movement of the arbor and the arbor support bracket, toward the box channel, the control end of the second plunger being bevelled, the adjacent end of the arbor and the arbor support bracket having an angular surface formed thereon, said bevelled surface pressing the arbor into the box channel, when the second plunger is moved into the operating position, said second plunger having a notch formed at one side thereof, the bottom of said notch being substantially parallel to the longitudinal axis of the second plunger, the wall of said second plunger at the bottom of the notch engaging the bevelled end of the arbor support bracket to retain the arbor in the separator box channel, while the first clamping plunger is moved into the clamping position, means pressing said plungers into the operating position, a pivoted lever operatively connecting the pressure actuating means with the control means, interposed between the plunger control means and the pressure actuating means, said lever progressively controlling the second plunger and the first plunger, a coiled compression spring fitted around each of said plungers independently restoring said plungers to their free position, when the actuating pressure is released, a depending lug integral with the arbor support bracket, a sliding rod mounted substantially parallel to the arbor support bracket, engaging said lug, a coiled compression spring pressing the end of said rod opposite the arbor support lug toward the lug to independently remove the arbor from the separator box channel, and restore the arbor support bracket to its free position, when the pressure of the second plunger thereagainst is released, one separator box channel being retained in the open position, while the separator box walls, adjacent the opposite channel, are clamped to the tape and the separator end attached thereto.

References Cited in the file of this patent

UNITED STATES PATENTS

| Number | Name | Date |
|---|---|---|
| 1,709,938 | Goldberg et al. | Apr. 23, 1929 |
| 1,973,720 | Lockie | Sept. 18, 1934 |
| 2,096,685 | Osgood | Oct. 19, 1937 |
| 2,303,748 | Lange | Dec. 1, 1942 |
| 2,453,860 | Rabinowitz | Nov. 16, 1948 |
| 2,523,388 | Natzke et al. | Sept. 26, 1950 |